(No Model.)
H. PATTBERG.
FRAME FOR PHOTOGRAPHS, PICTURES, &c.
No. 388,712. Patented Aug. 28, 1888.
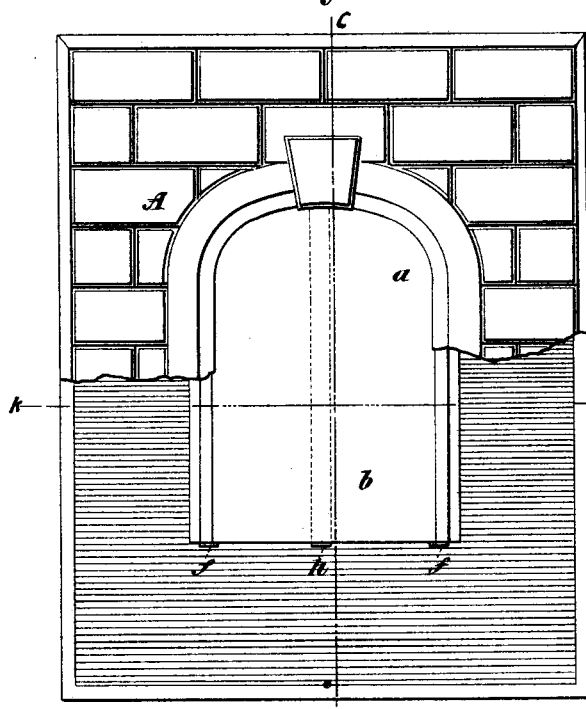
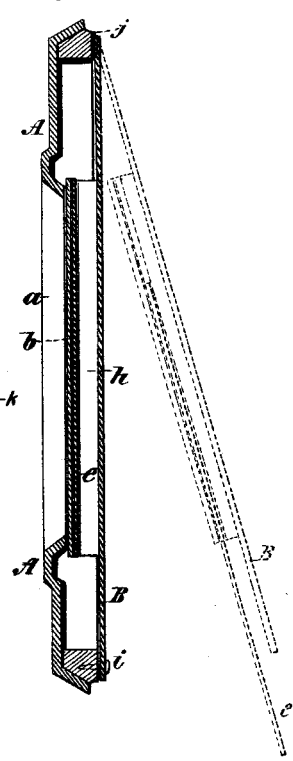
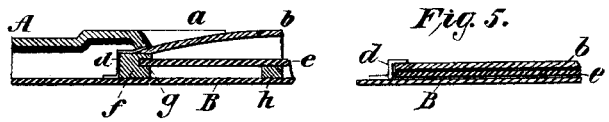
WITNESSES:
Gustaveh Dieterich
T. F. Bourne.
INVENTOR,
Hilarius Pattberg
BY Briesen & Steele
ATTORNEYS.

UNITED STATES PATENT OFFICE.

HILARIUS PATTBERG, OF JERSEY CITY, NEW JERSEY.

FRAME FOR PHOTOGRAPHS, PICTURES, &c.

SPECIFICATION forming part of Letters Patent No. 388,712, dated August 28, 1888.

Application filed November 15, 1887. Serial No. 255,189. (No model.)

*To all whom it may concern:*

Be it known that I, HILARIUS PATTBERG, of Jersey City, Hudson county, New Jersey, have invented an Improved Photograph or Picture Frame, of which the following is a specification.

The object of my invention is to provide an improved frame for holding photographs, pictures, &c., wherein the photograph, &c., may be readily inserted and removed without the necessity of removing pieces of pasteboard, wood, &c., which have heretofore been used to retain the picture in the frame.

The invention consists in the novel arrangement and combinations of parts, that will be more fully hereinafter set forth.

Reference is to be had to the accompanying drawings, forming part of this specification, in which—

Figure 1 is a partly-broken face view of a picture-frame constructed according to my invention. Fig. 2 is a vertical cross-section on the line $c\ c$, Fig. 1. Fig. 3 is a horizontal section on the line $k\ k$, Fig. 1; and Figs. 4 and 5 are sectional detail views of modifications.

In the accompanying drawings, A represents a frame, which may be of suitable material. The frame A has a suitably-shaped opening, $a$, through which the picture can be seen. To the frame A is hinged at $j$ a back board, B, which is adapted to cover the opening $a$. To the back board, B, is secured, either directly, as in Fig. 5, or by intervening cleats, $f$, as in Figs. 3 and 4, a glass, $b$, by means of a tape or other connection, $d$. This tape $d$ may run the whole length of the glass, if desired. Said tape is secured at one edge to the glass plate $b$, and at its other edge it is secured to the back board, B. The glass $b$ by this means may be at a slight distance from the back board, B, as in Fig. 5, which permits a photograph, $e$, picture, or the like to be inserted between the glass plate $b$ and the back board, B. The glass $b$ is preferably a little larger than the opening $a$, so as to always cover the opening. By thus securing the glass $b$ to the back board, B, the picture when inserted will always be in its proper position with reference to the opening $a$, and will be supported by the back board, B, wholly independent of the frame proper, A.

In some styles of frames there is quite a space between the front of the frame and the back plate. In this case I place cleats $f$, preferably of wood, between the glass $b$ and the back board, B. This raises the glass, so as to bring it and also the picture close to the front part of the frame. The tapes $d$ may be secured to the sides of the cleats $f$ for better security, if desired. The inner edges of the cleats $f$, near the glass $b$, are preferably recessed, as at $g$, into which recesses the edges of the picture are adapted to fit, as in Fig. 3. If desired, a center cleat, $h$, may be placed on the back board, B, between the cleats $f\ f$, upon which the center of the picture may rest. With this construction, when it is desired to adjust a picture in position, it is only necessary to swing outward the back board, B, which exposes the glass $b$. The picture may now be passed between the glass and the back board, B, and, when the cleats $f$ are used, will rest upon said cleats. The advantage of this construction is that the picture will always be brought to its proper position with relation to the opening in the frame, and is not liable to be displaced, even when the frame and its back are swung apart. If preferred, the back board, B, could be otherwise carried by the frame than by hinging it thereto; but with this construction the parts are always held relatively in position. A pin, $i$, passing through the back board, B, and into the frame A, may be used to hold the parts A and B together; but the parts A B may be otherwise suitably held together, if desired.

In the modification shown in Fig. 4 the recess $g$ is in the form of a groove in the sides of the cleats $f\ f$. Into this groove the edges of the picture $e$ pass. With this form of groove, pictures, photographs, &c., of varying widths may be inserted in a frame of a certain size. This will often be of great convenience.

Instead of the tapes $d$ being secured to the back board, B, they may be secured to the cleats $ff$, and said cleats be secured to the back board, B; but with either construction the cleats $f\ f$ are, by preference, secured to the back board by means of glue or otherwise.

If the glass $b$ were carried on the frame A, the same effects would be produced, provided the grooved cleats $f$ are employed.

Having now described my invention, what I claim is—

1. The frame A, having an opening, a, combined with the back board, B, and the glass b, carried by said back board, and with a picture-holder on said back board and behind said glass, whereby the picture and glass may be carried by the back board wholly independent of the frame, substantially as described.

2. The combination of the frame A, having an opening, a, back board, B, having cleats f, and recesses in said cleats for the reception of a picture, whereby the picture may be carried by the back board and independent of the frame, substantially as described.

3. The combination of the open frame A, hinged back board, B, having recessed cleats f f, and glass b, held on said cleats in front of the picture-recesses of said cleats, substantially as described.

HILARIUS PATTBERG.

Witnesses:
HARRY M. TURK.
GUSTAV SCHNEPPÉ.